(12) United States Patent
Adamjee et al.

(10) Patent No.: US 12,067,968 B2
(45) Date of Patent: Aug. 20, 2024

(54) ALTERATION OF SPEECH WITHIN AN AUDIO STREAM BASED ON A CHARACTERISTIC OF THE SPEECH

(71) Applicant: Capital One Services, LLC, McLean, VA (US)

(72) Inventors: Tasneem Adamjee, McKinney, TX (US); Lin Ni Lisa Cheng, New York, NY (US); Tyler Maiman, Melville, NY (US); Yichen Zhang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 186 days.

(21) Appl. No.: 17/446,382

(22) Filed: Aug. 30, 2021

(65) Prior Publication Data

US 2023/0066847 A1 Mar. 2, 2023

(51) Int. Cl.
*G10L 13/033* (2013.01)
*G10L 15/00* (2013.01)
*H04M 3/51* (2006.01)

(52) U.S. Cl.
CPC ............ *G10L 13/033* (2013.01); *G10L 15/00* (2013.01); *H04M 3/51* (2013.01)

(58) Field of Classification Search
None
See application file for complete search history.

(56) References Cited

U.S. PATENT DOCUMENTS

| 8,401,856 | B2* | 3/2013 | Jennings | G10L 15/08 704/258 |
| 8,849,666 | B2 | 9/2014 | Jaiswal et al. | |
| 9,870,769 | B2 | 1/2018 | Liu et al. | |
| 9,922,641 | B1* | 3/2018 | Chun | G10L 15/07 |
| 10,044,864 | B2* | 8/2018 | Odinak | H04M 3/5175 |
| 2009/0171670 | A1 | 7/2009 | Bailey et al. | |
| 2020/0169591 | A1* | 5/2020 | Ingel | G10L 13/08 |
| 2022/0189475 | A1* | 6/2022 | Kwatra | G10L 25/63 |
| 2022/0293122 | A1* | 9/2022 | Shah | H04M 3/2281 |

* cited by examiner

*Primary Examiner* — Nicole A K Schmieder
(74) *Attorney, Agent, or Firm* — Harrity & Harrity, LLP

(57) ABSTRACT

In some implementations, a system may receive an audio stream associated with a call between a user and an agent. The system may process, by the device and using a speech alteration model, speech from a first channel of the audio stream to alter the speech from having a first speech characteristic to having a second speech characteristic, wherein the speech alteration model is trained based on reference audio data associated with the first speech characteristic and the second speech characteristic and based on reference speech data associated with the first speech characteristic and the second speech characteristic. The system may extract the speech from the first channel that has the first speech characteristic. The system may provide, within a second channel of the audio stream, altered speech that corresponds to the speech and that has the first speech characteristic.

20 Claims, 6 Drawing Sheets

US 12,067,968 B2

ALTERATION OF SPEECH WITHIN AN AUDIO STREAM BASED ON A CHARACTERISTIC OF THE SPEECH

BACKGROUND

A customer service center (e.g., a call center, chat interface and/or the like) is equipped to handle customer communications such as telephone communications, e-mail, messages, and/or live chat communications. The customer service center may route such communications to appropriate employees (e.g., service representatives) and/or platforms associated with an entity in order to provide a customer service or receive and/or respond to customer feedback regarding services provided by the entity.

SUMMARY

Some implementations described herein relate to a system for altering speech of a speaker in an audio stream. The system may include one or more memories and one or more processors communicatively coupled to the one or more memories. The system may be configured to receive an audio stream associated with a call between a user and an agent associated with a call center. The system may be configured to determine that the agent is associated with speech within the audio stream. The system may be configured to determine that a speech preference of the user indicates that the user prefers a second speech characteristic that is different from the first speech characteristic. The system may be configured to process, using a speech alteration model and to form altered speech, the audio stream to alter the speech from having the first speech characteristic to having the second speech characteristic. The system may be configured to replace the speech within a user channel of the audio stream with the altered speech. The system may be configured to provide, via the user channel, the altered speech to the user to enable the user to listen to the speech associated with the agent according to the speech preference.

Some implementations described herein relate to a non-transitory computer-readable medium that stores a set of instructions for a system. The set of instructions, when executed by one or more processors of the system, may cause the system to receive an audio stream associated with a call between a user and an agent. The set of instructions, when executed by one or more processors of the system, may cause the system to process, using a speech analysis model, user speech within the audio stream that is associated with the user to identify a user accent associated with the user. The set of instructions, when executed by one or more processors of the system, may cause the system to determine that an agent accent of the agent is associated with a second type of accent that is different from the first type of accent. The set of instructions, when executed by one or more processors of the system, may cause the system to process, using a speech alteration model and based on determining that the second type of accent is different from the first type of accent, the audio stream to alter agent speech within the audio stream that has the second type of accent. The set of instructions, when executed by one or more processors of the system, may cause the system to replace, within a user channel of the audio stream, the agent speech with the altered agent speech. The set of instructions, when executed by one or more processors of the system, may cause the system to provide, via the user channel, the altered agent speech to the user.

Some implementations described herein relate to a method for altering speech of a speaker in an audio stream. The method may include receiving, by a device, an audio stream associated with a call between a user and an agent. The method may include processing, by the device and using a speech alteration model, speech from a first channel of the audio stream to alter the speech from having a first speech characteristic to having a second speech characteristic, where the speech alteration model is trained based on reference audio data associated with the first speech characteristic and the second speech characteristic and based on reference speech data associated with the first speech characteristic and the second speech characteristic. The method may include extracting, by the device, the speech from the first channel that has the first speech characteristic. The method may include providing, by the device and within a second channel of the audio stream, altered speech that corresponds to the speech and that has the first speech characteristic.

DETAILED DESCRIPTION

Figure 1A:
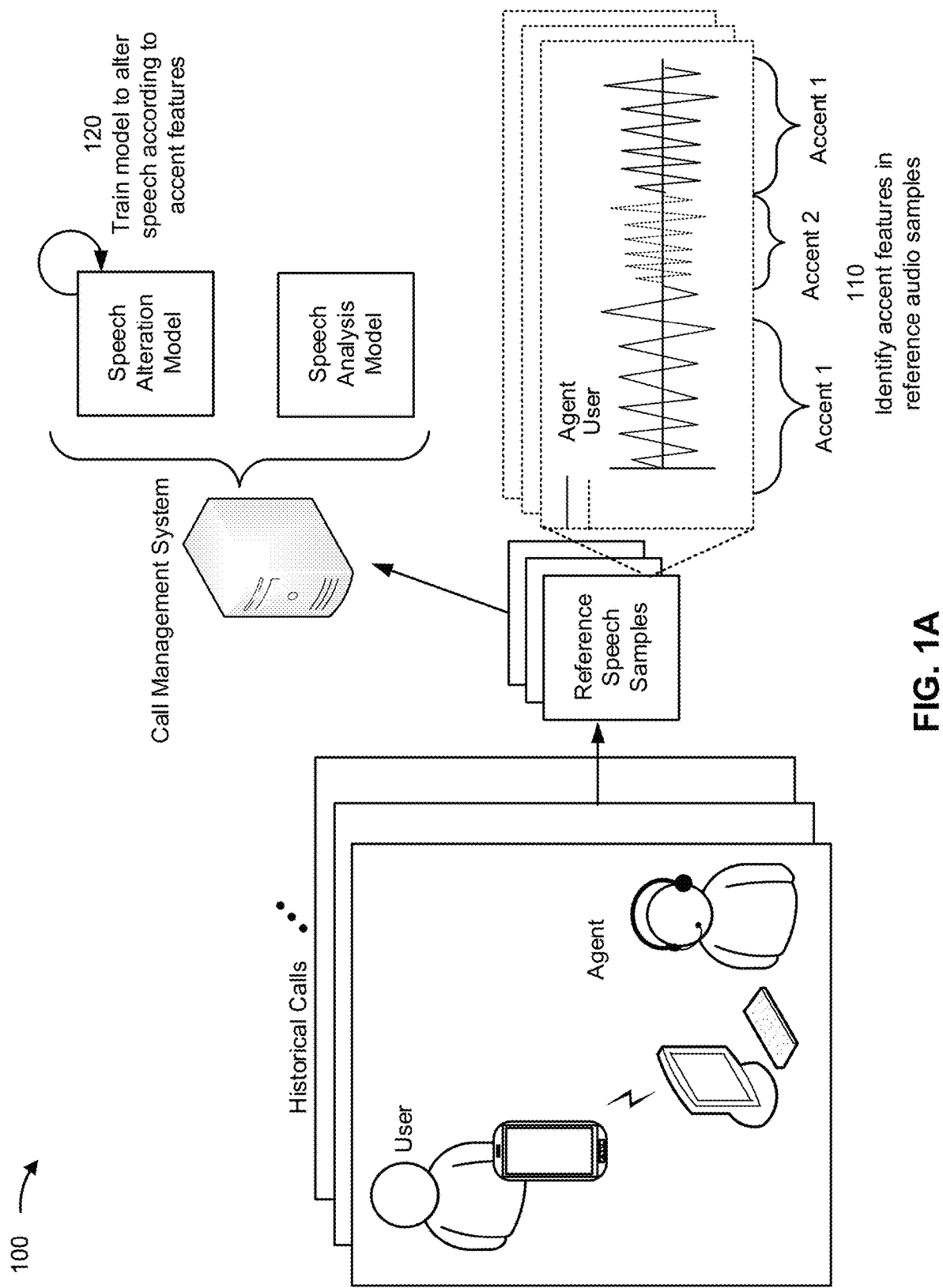
FIGS. 1A-1C are diagrams of an example implementation associated with altering speech within an audio stream based on a characteristic of the speech.

The following detailed description of example implementations refers to the accompanying drawings. The same reference numbers in different drawings may identify the same or similar elements.

A call center allows users or individuals to communicate and/or engage with agents of an entity associated with the call center. The users may be consumers or customers that are seeking assistance with or information associated with a product or service that is offered by the entity. The agents may provide the assistance or information via voice calls that are managed by the call center (e.g., via a call management system that hosts calls between the users and the agents). In some cases, due to one or more characteristics of an agent's speech, a user may be incapable of understanding the agent (or at least certain words or phrases spoken by the agent). For example, the user may be unfamiliar with or not used to a certain accent of the agent. Similarly, an agent may be unable to understand a user due to certain characteristics of the user's speech. Typically, this can degrade the user experience due to frustrations and delays caused by the misunderstandings. Often times, in such cases, the user may be rerouted to another agent with the hope that the user can better understand a different agent. Such a practice can lead to further delays, unnecessarily consume additional resources, such as computing resources (e.g., processor or memory resources wasted during the call while the user or agent cannot understand one another and/or processor or memory resources consumed while the user is on hold until the user reaches another agent) and/or communication resources (e.g., network resources used to reroute or redirect the call). While an individual's speech may be synthesized (e.g., into a computer-generated voice or robotic voice), synthesized speech may not always be understandable to a user and/or preferred by the user (e.g., because the user is not familiar with the synthesized speech)

Some implementations described herein provide a call management system that enhances clarity of speech of an agent or a user according to a particular speech characteristic (e.g., an accent, inflection points of phonemes, phonemes of spoken words, pronunciations of spoken words, or the like) of the agent and/or the user. For example, as described herein, the call management system may analyze, using a speech analysis model, speech associated with a user and/or an agent, determine user speech characteristic associated with the user and/or an agent speech characteristic associated with the agent, and alter speech of the user and/or speech of agent during a call according to the user speech characteristic and/or the agent speech characteristic. More specifically, the call management system may alter the speech of the agent to align with a speech preference or user speech characteristic, and/or the call management system may alter the speech of the user to align with a speech preference and/or agent speech characteristic of the agent. The classification model may utilize a speech alteration model to generate altered speech from received audio in the audio stream. For example, to alter an agent's speech, the speech analysis model may alter audio received on an agent audio input of an agent channel of the audio stream to generate the altered speech and provide, via a user channel, the altered speech to a user to enable the user to listen to speech of the agent according to a speech preference of the user.

In this way, the call management system may enhance a user experience associated with calls with a call center while reducing or preventing the consumption of resources involved in hosting calls involving a user and agent being unable to understand one another and/or reducing or preventing the consumption of resources involved in rerouting calls between users agents unable to understand one another.

Figure 1B:
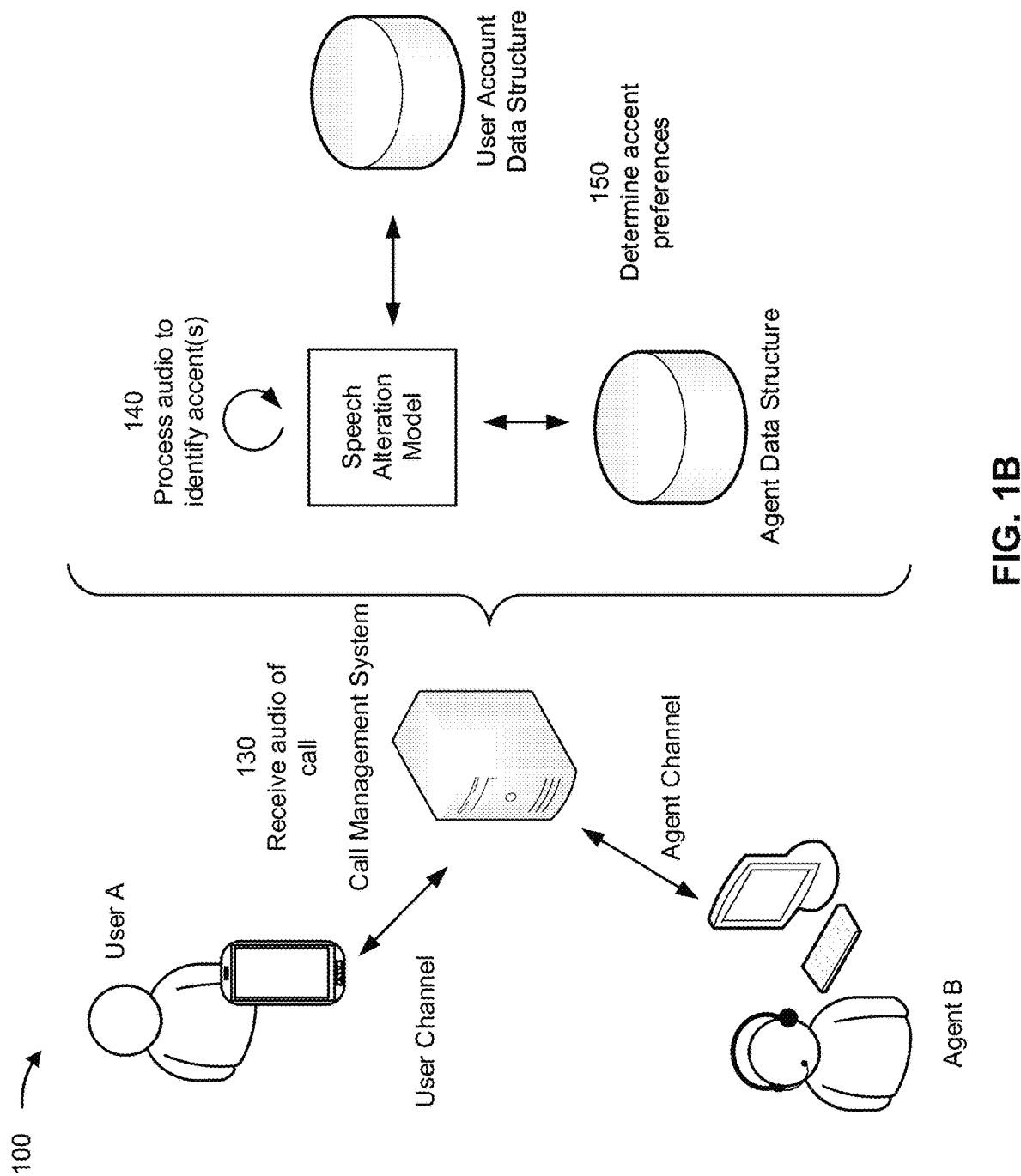
Figure 1C:
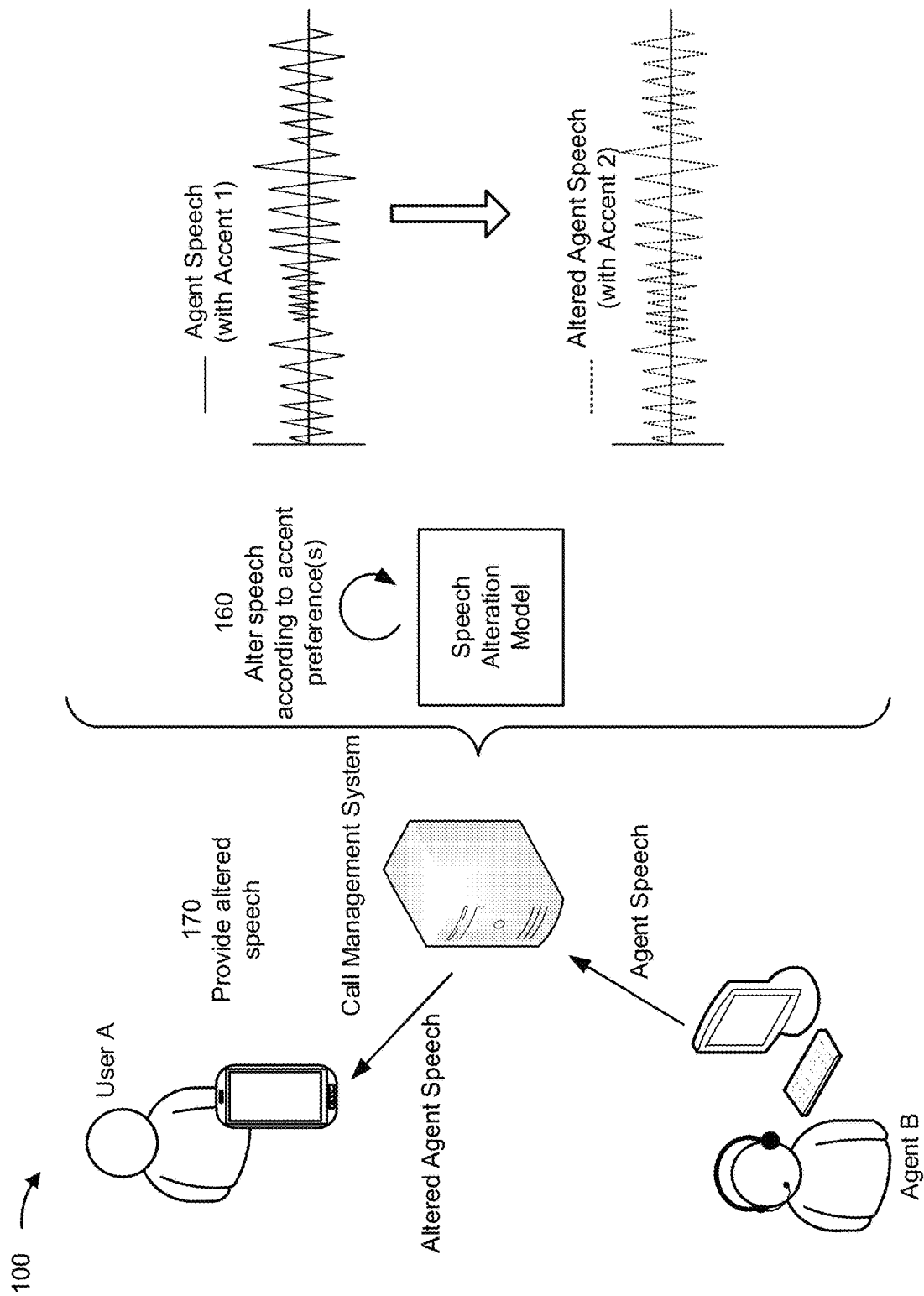

FIGS. 1A-1C are diagrams of an example implementation 100 associated with altering speech within an audio stream based on a characteristic of the speech. Example implementation 100 includes a call management system, a user device, and an agent device. These devices are further described below, at least in connection with FIG. 2 and FIG. 3.

The call management system of example implementation 100 may be associated with a call center that is associated with (e.g., owned and/or operated by) an entity (e.g., a service provider or organization that provides a customer service via the call center). As shown, the call management system may include a speech analysis model that is configured to analyze audio in association with identifying a user accent in speech and a speech alteration model that is configured to alter speech of the user based on the user accent. The call management system may include a user account data structure that is associated with user accounts of users associated with the entity (e.g., subscribers or customers of entity) and an agent data structure that is associated with agents of the entity (e.g., customer representatives of the entity).

As shown in FIG. 1A, and by reference number 110, the call management system identifies accent features in reference audio samples. For example, as shown, the call management system may be configured to analyze (e.g., using a speech processing technique, such as a natural language processing technique, a voice recognition technique, or the like) reference audio samples to identify speech characteristics, such as an accent of a language, and/or audio characteristics associated with the accent and/or corresponding inflection points or phonemes of the accent. As shown, the reference audio samples may be associated with historical calls between users and agents (e.g., historical calls that are recorded by a call center for customer services purposes). In some implementations, the reference audio samples may be specifically associated with a particular accent of a language and/or may be associated with a specific agent associated with the call center. Correspondingly, certain sets of inflection points for the accent (e.g., for certain words or phonemes of the language) can be identified for the accent and/or the agent. Accordingly, inflection points, audio characteristics (e.g., an audio volume, an audio tempo, an audio pitch, and/or an audio tone), and/or other features of a particular accent of an agent can be identified for the agent. Similarly, certain features can be learned and/or identified for or across multiple agents and/or for or across multiple other types of individuals (e.g., using reference audio samples from conversations or speech content that is not associated with the historical calls).

In some implementations, the reference audio samples may include or be associated with reference speech data that is associated with audio that includes speech in a default accent of a language. The default accent may be a most commonly understood accent of a language in a particular geographical area. Accordingly, similar to identifying certain features of a particular accent (e.g., an agent' accent or a user's accent), the speech analysis model may be configured to identify features of the default accent to permit the speech analysis model to learn and/or indicate inflection points, audio characteristics, and/or other features of the default accent. In this way, as described herein, the speech alteration model may identify features associated with differences between the default accent and a particular accent. Similarly, the speech alteration model may identify features associated with difference between a first accent (e.g., an accent of a user or a "user accent") and a second accent (e.g., an accent of an agent or an "agent accent").

As further shown in FIG. 1A, and by reference number 120, the call management system trains the speech alteration model to alter speech according to the accent features. For example, the call management system may train the speech alteration model according to the identified inflection points, audio characteristics, and/or other features of accents that are identified and/or learned by the speech analysis model from the reference audio samples. The call management system (or another system associated with the call center or entity) may train the speech alteration model according to any suitable technique, such as a random-forest technique, a clustering technique, a neural network technique, a deep learning technique, or any other artificial intelligence training technique.

The speech analysis model (and/or the speech alternation model) may be trained to identify a type of accent of speech based on reference audio data associated with various accents of a type of accent and/or reference speech data associated with speech in the type of accent. As an example, for a southern American accent in English, reference audio data (e.g., from the reference audio samples) can include audio of speech with various accents (e.g., from multiple individuals with southern American accents) associated with the southern American accent. The reference audio data may include and/or indicate audio characteristics of respective inflection points of the various accents. The speech analysis model and/or the speech analysis model may analyze and/or compare the reference audio data with speech (and/or with corresponding inflection points of speech) from reference speech data (e.g., from reference speech associated with a default accent and/or a standard southern American accent). Accordingly, the speech alteration model, based on the identified accent, may be trained to identify differences in audio characteristics between accents.

In some implementations, the accent features from the reference audio samples may be obtained according to a supervised learning technique. For example, corresponding inflection points of words in difference accents can be mapped to one another by an individual and/or indicated as related or unrelated by an individual (e.g., using timestamps for individual inflection points in different audio samples). In this way, using the supervised learning technique, the speech analysis model and/or the speech alteration model may identify differences in accent features for various accents associated with a type of accent and/or for different types of accents to permit the call management system (or other system) to train the speech alteration model differences in inflection points of the various accents or different types of accents. Additionally, or alternatively, the call management system may utilize an unsupervised learning technique (e.g., using a clustering technique, natural language processing, and/or the like) to train the speech analysis model and/or the speech alteration model.

As shown in FIG. 1B, and by reference number 130, the call management system receives audio of a call between the user device and the agent device. For example, the call management system may receive an audio stream that is associated with a call between a user (User A) and an agent (Agent B) associated with the call center. The call management system may receive the audio stream based on being configured to host and/or facilitate the call between the user and the agent.

The audio stream may be communicated between a user device associated with the user and an agent device associated with the agent. The audio stream may include a user channel that is between the user device and the call management system and an agent channel that is between the call management system and the agent device. The user channel may include a user audio input (audio input from the user device to the call management system) and a user audio output (an output from the call management system to the user device). Similarly, the agent channel may include an agent audio input (audio input from the agent device to the call management system) and an agent audio output (an output from the call management system to the agent device). Accordingly, the call management system may receive audio of the call from the agent with speech (e.g., first speech) in an agent accent (e.g., a first speech characteristic or first accent) and/or audio of the call from the user with speech (e.g., second speech) in a user accent (e.g., a second speech characteristic or second accent).

In this way, the call management system may monitor an audio stream associated with a call to alter speech of the call, as described herein.

As further shown in FIG. 1B, and by reference number 140, the call management system processes the audio to identify one or more accents associated with speech in the call. For example, the call management system may process a user audio input, using the speech analysis model to identify a user accent, and the agent audio input, using the speech analysis model, to identify an agent accent. The call management system, via the speech analysis model and/or the speech alteration model, may determine that an agent accent of the agent is associated with a second type of accent that is different from the first type of accent.

In some implementations, the call management system may monitor the user audio input and/or the agent audio input to identify which speech of the audio stream is associated with which speaker (e.g., the user or the agent). Accordingly, based on audio with speech being received via an agent channel, the call management system may determine that the agent is associated with the speech within the audio stream.

Based on differences between the user speech and the agent speech, the call management system may determine that the user is associated with a first type of accent (or accent type) and that the agent is associated with a second type of accent. Accordingly, based on the user speech and the agent speech being different, the call management system may infer that the user speech in the user audio input is to be altered for the agent audio output and/or that the agent speech in the agent audio input is to be altered for the user audio output. In such a case, as described elsewhere herein, while the user may speak with a user accent, the agent may hear the user speech in the agent accent. On the other hand, while the agent may speak in the agent accent, the user may hear the agent speech in the user accent.

As further shown in FIG. 1B, and by reference number 150, the call management system may determine accent preferences associated with the user and/or the agent. A speech preference of a user or agent may be associated with the user or agent engaging in calls with the call center. In some implementations, the accent preference of the user may be inferred from an identified user accent of the user and the accent preference of the agent may be inferred from an identified agent accent of the agent.

In some implementations, the call management system may compare speech preferences of the user and the agent to determine whether the speech preferences are the same or different. If the speech preferences are the same, the call management system may not alter speech of the user or the agent, as described herein, and may forgo processing the audio to alter the audio. On the other hand, if the call management system determines that the speech preference of the user indicates that the user prefers a different speech characteristic than is associated with the speech characteristic of the speech of the agent, the call management system may process the audio to alter the audio, as described elsewhere herein.

In some implementations, the call management system may maintain speech characteristic information associated with agents of the call center. For example, the call management system may map an accent to an agent of the call center in the agent data structure (e.g., based on the speech analysis model and/or the speech alteration model identifying that an agent has a particular accent). Additionally, or alternatively, the call management system may map an accent to a user (e.g., via a user account) that has previously called into the call center (e.g., based on the speech analysis model and/or the speech alteration model identifying that the user has a particular accent and/or based on the user indicating a particular speech preference and/or accent preference in association with a user account of the user). In this way, if the call management system has previously learned and/or identified a speech characteristic (or speech preference) of the user a speech characteristic of the agent, the call management system may determine a speech characteristic for a user or an agent based on the speech characteristic being mapped to the user or the agent in a data structure. The call management system may look up, in the user account data structure, the speech characteristic of the user using an identifier associated with the user (e.g., an account identifier, an identifier associated with the user device). Additionally, or alternatively, the call management system may look up the speech characteristic of the agent using an identifier associated with the agent (e.g., an employee identifier and/or an identifier associated with the agent device).

In this way, the call management system may determine that the agent has an agent speech characteristic (or agent accent) based on a data structure indicating that the agent device is mapped to the agent speech characteristic. Similarly, the call management system may determine that the user has a user speech characteristic (or user accent) based on a data structure indicating that the user device is mapped to the user speech characteristic.

As shown in FIG. 1C, and by reference number 160, the call management system alters the speech according to the speech preferences. For example, the call management system, using a speech alteration model, may process the audio stream to alter the speech from having a first speech characteristic to having a second speech characteristic to form altered speech. More specifically, the call management system may process the audio stream to alter agent speech associated with the agent to form altered agent speech that has a speech characteristic or accent that is preferred by the user. Additionally, or alternatively, the call management system may process the audio stream to alter user speech associated with the user to form altered user speech that has a speech characteristic or accent that is preferred by the agent.

To alter agent speech in the audio stream, the call management system may use a speech recognition technique to identify a word in speech associated with a speech characteristic (e.g., a first speech characteristic associated with the agent). The call management system may identify, according to the word and a first speech characteristic (e.g., an agent speech characteristic or agent accent), a first set of inflection points of audio (e.g., from the audio stream) associated with the word. Furthermore, the call management system may alter, according to the word and a second speech characteristic (e.g., a user speech characteristic or user accent), an audio characteristic (e.g., an audio volume, an audio tempo, an audio pitch, and/or an audio tone) of the first set of inflection points to form a second set of inflection points for the word (e.g., for corresponding phonemes of the word).

To process agent speech, the call management system may cause the speech alteration model to analyze an agent audio input of the audio stream. In some implementations, the call management system may cause the speech alteration model to only process the agent audio input of the audio stream to alter the agent speech (e.g., to avoid wasting resources processing and/or altering speech of the user from the user audio input or user channel). Similarly, to process user speech, the call management system may cause the speech alteration model to analyze a user audio input (or user channel) of the audio stream. In some implementations, the call management system may cause the speech alteration model to only process the user audio input of the audio stream to alter the user speech (e.g., to avoid wasting resources processing and/or altering speech of the agent from the agent audio input or agent channel).

As further shown in FIG. 1C, and by reference number 170, the call management system may provide the altered speech. For example, as shown with respect to received agent speech, the call management system may provide altered agent speech to the user via the user channel. In this way, the call management system may enable the user to listen to the speech associated with the agent according to the speech preference.

The call management system may replace agent speech received via the agent channel with altered agent speech that is formed as described herein. For example, the call management system may extract a portion of the agent speech from the agent channel (or first channel) and provide (or replace) the portion of speech with the altered speech (e.g., for the corresponding portion of the agent speech). In this way, the altered agent speech may sound, to the user, to be in an accent that is preferred and/or associated with the user (e.g., the identified accent of the user).

Accordingly, to alter agent speech, the call management system may adjust one or more audio characteristics of the agent speech, and, to alter user speech, the call management system may adjust one more audio characteristics of the user speech, as described herein. In this way, the call management system may improve a user experience with respect to engaging in customer service calls and conserve resources that would otherwise be wasted on calls between users and agents that are unable to understand each other.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
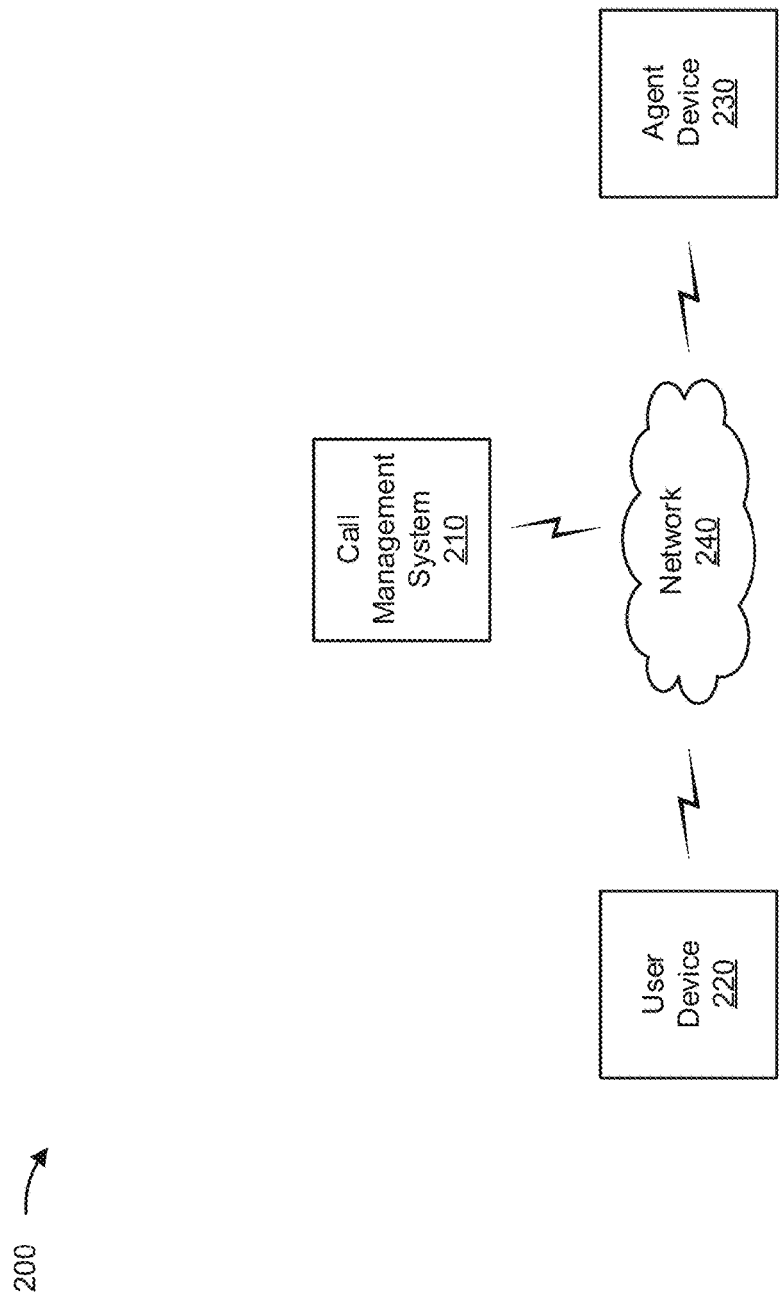
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a call management system 210, a user device 220, an agent device 230, and a network 240. Devices of environment 200 may interconnect via wired connections, wireless connections, or a combination of wired and wireless connections.

The call management system 210 includes one or more devices capable of receiving, generating, storing, processing, providing, and/or routing information for a call in association with altering speech within an audio stream based on a characteristic of the speech, as described elsewhere herein. The call management system 210 may include a communication device and/or a computing device. For example, the call management system 210 may include a server, such as an application server, a client server, a web server, a database server, a host server, a proxy server, a virtual server (e.g., executing on computing hardware), or a server in a cloud computing system. In some implementations, the call management system 210 includes computing hardware used in a cloud computing environment.

The user device 220 includes one or more devices capable of receiving, generating, storing, processing, and/or providing information associated with a call with the agent device 230 and that is managed by the call management system 210, as described elsewhere herein. The user device may include a communication device and/or a computing device. For example, the user device 220 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. The user device 220 may be associated with a user, as described elsewhere herein.

The agent device 230 includes one or more devices capable of receiving, generating, storing, processing, and/or providing information associated with a call with the user device 220 and that is managed by the call management system 210, as described elsewhere herein. The agent device 230 may include a communication device and/or a computing device. For example, the agent device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The agent device 230 may be associated with an agent, a call center, and/or an entity that provides a customer service, as described elsewhere herein.

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
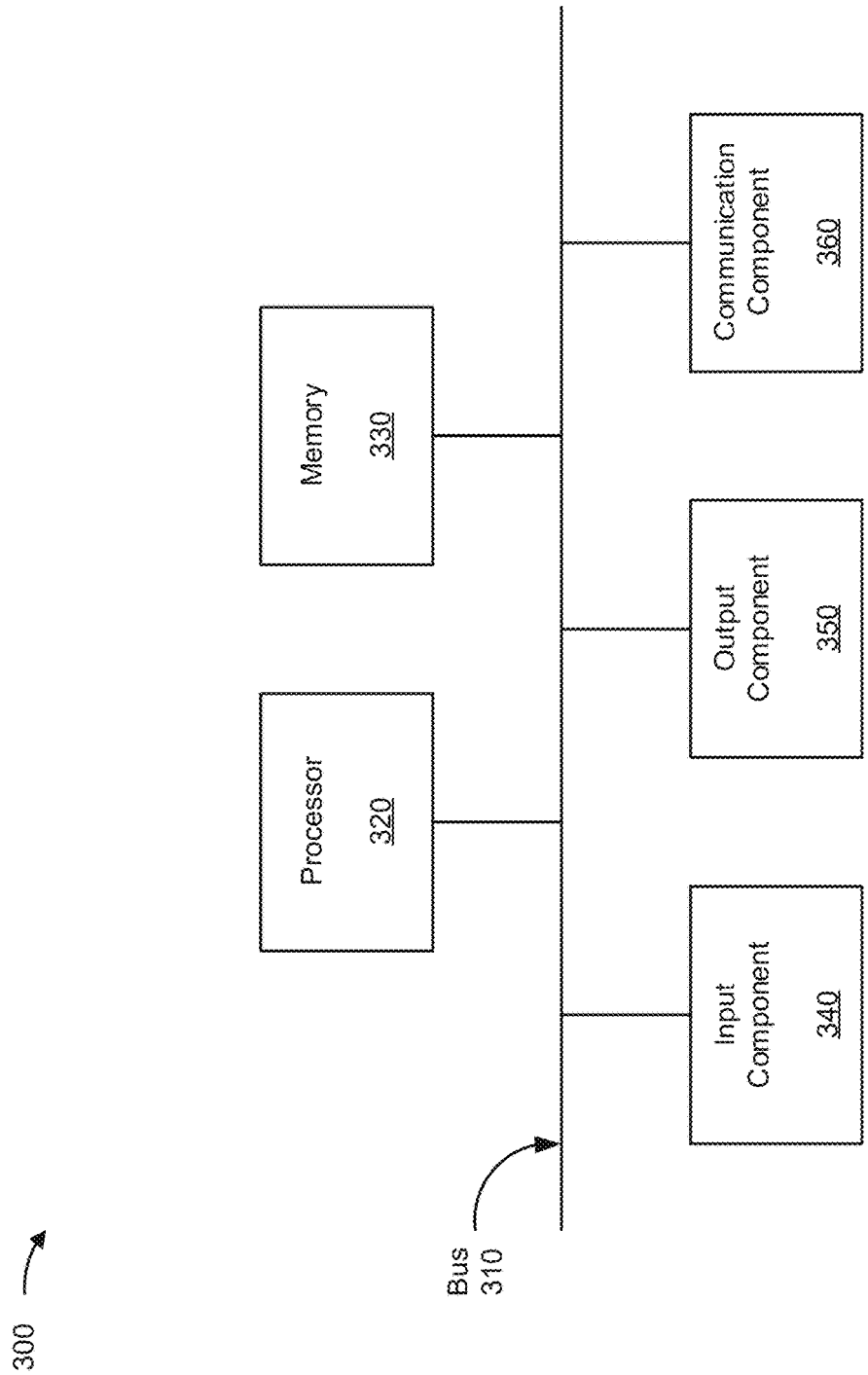
FIG. 3 is a diagram of example components of one or more devices of FIG. 2.

FIG. 3 is a diagram of example components of a device 300, which may correspond to the call management system 210, the user device 220, and/or the agent device 230. In some implementations, the call management system 210, the user device 220, and/or the agent device 230 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
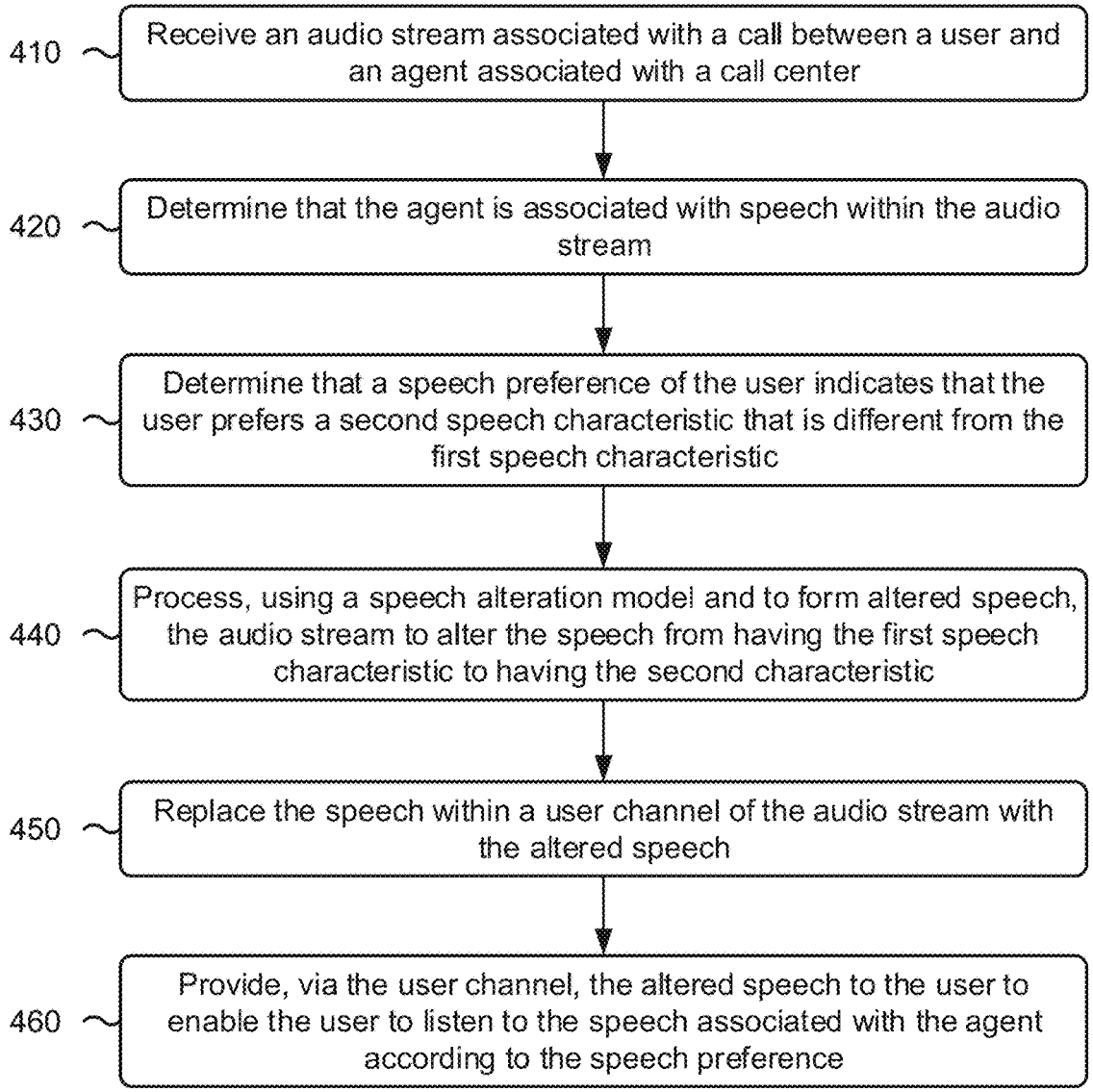
FIG. 4 is a flowchart of an example process associated with altering speech within an audio stream based on a characteristic of the speech.

FIG. 4 is a flowchart of an example process 400 associated with obfuscating a section of audio based on context of the audio. In some implementations, one or more process blocks of FIG. 4 may be performed by a call management system (e.g., call management system 210). In some implementations, one or more process blocks of FIG. 4 may be performed by another device or a group of devices separate from or including the call management system, such as the user device 220 and/or the agent device 230. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an audio stream associated with a call between a user and an agent associated with a call center (block 410). As further shown in FIG. 4, process 400 may include determining that the agent is associated with speech within the audio stream, wherein the speech has a first speech characteristic (block 420). As further shown in FIG. 4, process 400 may include determining that a speech preference of the user indicates that the user prefers a second speech characteristic that is different from the first speech characteristic, wherein the speech preference is associated with the user engaging in calls with the call center (block 430).

As further shown in FIG. 4, process 400 may include processing, using a speech alteration model and to form altered speech, the audio stream to alter the speech from having the first speech characteristic to having the second speech characteristic (block 440). The speech alteration model may be trained based on reference audio data associated with the agent and reference speech data associated with the second speech characteristic.

As further shown in FIG. 4, process 400 may include replacing the speech within a user channel of the audio stream with the altered speech (block 450). As further shown in FIG. 4, process 400 may include providing, via the user channel, the altered speech to the user to enable the user to listen to the speech associated with the agent according to the speech preference (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for altering speech of a speaker in an audio stream, the system comprising:
   one or more memories; and
   one or more processors, communicatively coupled to the one or more memories, configured to:
      receive an audio stream associated with a call between a user and an individual associated with a call center;
      determine, using a model, a first speech characteristic corresponding to an accent characteristic of the individual based on speech in the audio stream associated with the individual, wherein the model is trained to determine an accent characteristic based on:
         reference speech data that indicates inflection points associated with an accent characteristic of the user for words of a language and corresponding inflection points associated with the accent characteristic of the individual for the words, and
         reference audio data that indicates audio characteristics of respective inflection points of multiple accents associated with the accent characteristic of the user and corresponding audio characteristics of respective inflection points of multiple accents associated with the accent characteristic of the individual;
      determine whether the accent characteristic of the user is different from the accent characteristic of the individual based on a comparison of the accent characteristic of the user and the accent characteristic of the individual;
      process, using a speech alteration model and to form altered speech, the audio stream to alter the speech from having the first speech characteristic to having a second speech characteristic that corresponds to the accent characteristic of the user, based on determining whether the accent characteristic of the user is different from the accent characteristic of the individual,
         wherein the speech alteration model is trained based on the reference audio data and the reference speech data;
      replace the speech within a user channel of the audio stream with the altered speech; and
      provide, via the user channel, the altered speech to the user to enable the user to listen to the speech associated with the individual according to the accent characteristic of the user.

2. The system of claim 1, wherein the speech is determined to be associated with the individual based on being received via an agent audio input of the audio stream,
wherein the agent audio input is received from an agent device that is associated with the individual,
wherein the accent characteristic of the individual is determined based on a data structure indicating that the agent device is mapped to the accent characteristic of the individual.

3. The system of claim 1, wherein the one or more processors, to determine the accent characteristic of the user, are configured to:
identify the user based on a user account associated with the user; and
lookup, in a data structure associated with the user account, the accent characteristic of the user.

4. The system of claim 1, wherein the one or more processors, to process the audio stream to form altered speech, are configured to:
cause, based on determining that the individual is associated with the speech, the speech alteration model to analyze an agent audio input of the audio stream,
wherein the agent audio input is received from an agent device associated with the individual.

5. The system of claim 1, wherein, to alter the speech, the speech alteration model is configured to:
identify, using a speech recognition technique and according to the first speech characteristic, a word in the speech;
identify, according to the word and the first speech characteristic, a first set of inflection points of audio associated with the word; and
alter, according to the word and the second speech characteristic, an audio characteristic of the first set of inflection points to form a second set of inflection points for the word.

6. The system of claim 5, wherein, to form a portion of the altered speech for the word, the first set of inflection points are replaced with the second set of inflection points.

7. The system of claim 5, wherein the audio characteristic comprises at least one of:
an audio volume,
an audio tempo,
an audio pitch, or
an audio tone.

8. The system of claim 1, wherein the speech is first speech and the altered speech is first altered speech, and
wherein the one or more processors are further configured to:
receive, via a user audio input of the audio stream, second speech associated with the user,
wherein the second speech has the second speech characteristic;
process, using the speech alteration model and based on the first speech having the first speech characteristic, the user audio input to alter the second speech from having the second speech characteristic to having the first speech characteristic;
replace the second speech within an agent channel of the audio stream with second altered speech; and
provide, via the agent channel, the second altered speech to the individual to enable the individual to listen to the second speech with the first speech characteristic.

9. A non-transitory computer-readable medium storing a set of instructions, the set of instructions comprising:
one or more instructions that, when executed by one or more processors of a system, cause the system to:
receive an audio stream associated with a call between a user and an individual;
process, using a speech analysis model, user speech within the audio stream that is associated with the user to identify a user accent associated with the user, wherein the user accent is a first type of accent, and wherein the speech analysis model is trained to identify a type of accent based on:
reference speech data that indicates inflection points associated with the first type of accent for words of a language and corresponding inflection points associated with a second type of accent for the words, and
reference audio data that indicates audio characteristics of respective inflection points of multiple accents associated with the first type of accent and corresponding audio characteristics of respective inflection points of multiple accents associated with the second type of accent;
determine whether an accent characteristic of the user is different from an accent characteristic of the individual based on a comparison of the accent characteristic of the user and the accent characteristic of the individual;
process, using a speech alteration model and based on determining whether the accent characteristic of the user is different from the accent characteristic of the individual, the audio stream to alter speech of the individual, within the audio stream, that has the second type of accent,
wherein the speech alteration model is configured to form, from the speech, altered speech associated with the individual and that has the first type of accent, and wherein the speech alteration model is trained based on the reference audio data and the reference speech data;
replace, within a user channel of the audio stream, the speech with the altered speech; and
provide, via the user channel, the altered speech to the user.

10. The non-transitory computer-readable medium of claim 9, wherein the individual is determined to be associated with the second type of accent based on the speech analysis model processing the speech within the audio stream to identify an accent of the individual, and
wherein the speech analysis model identifies that the accent of the individual is the second type of accent.

11. The non-transitory computer-readable medium of claim 9, wherein the one or more instructions, that cause the system to process the audio stream to form the altered speech, cause the system to:
cause the speech alteration model to only process an agent audio input of the audio stream,
wherein the agent audio input is received from an agent device associated with the individual.

12. The non-transitory computer-readable medium of claim 9, wherein, to alter the speech, the speech alteration model is configured to:
identify, using a speech recognition technique and according to the second type of accent, a word in the speech;
identify, according to the word and the second type of accent, a first set of inflection points of audio associated with the word; and alter, according to the word and the first type of accent, an audio characteristic of the first set of inflection points to form a second set of inflection points for the word,
wherein, to form a portion of the altered speech for the word, the first set of inflection points are replaced with the second set of inflection points.

13. The non-transitory computer-readable medium of claim 9, wherein the one or more instructions, when executed, further cause the system to:
process, using the speech alteration model and based on determining whether the accent characteristic of the user is different from the accent characteristic of the individual, the audio stream to alter user speech within the audio stream that has the first type of accent,
wherein the speech alteration model is configured to form, from the user speech, altered user speech associated with the user and that has the first second type of accent;
replace, within an agent channel of the audio stream, the user speech with the altered user speech; and
provide, via the agent channel, the altered user speech to the individual.

14. A method for altering speech of a speaker in an audio stream, comprising:
receiving, by a device, an audio stream associated with a call between a user and an individual;
identifying, by the device and using a model, an accent characteristic of the individual based on speech within the audio stream, wherein the model is trained to identify an accent characteristic based on:
reference speech data that indicates inflection points associated with an accent characteristic of the user for words of a language and corresponding inflection points associated with the accent characteristic of the individual for the words, and
reference audio data that indicates audio characteristics of respective inflection points of multiple accents associated with the accent characteristic of the user and corresponding audio characteristics of respective inflection points of multiple accents associated with the accent characteristic of the individual;
determining whether the accent characteristic of the user is different from the accent characteristic of the individual based on a comparison of the accent characteristic of the user and the accent characteristic of the individual;
processing, by the device and based on determining whether the accent characteristic of the user is different from the accent characteristic of the individual, the speech from a first channel of the audio stream to alter the speech from having a first speech characteristic corresponding to an accent of the individual to having a second speech characteristic corresponding to an accent of the user,
wherein a speech alteration model for altering the speech is trained based on the reference audio data and based on the reference speech data;
extracting, by the device, the speech from the first channel that has the first speech characteristic; and
providing, by the device and within a second channel of the audio stream, altered speech that corresponds to the speech and that has the second speech characteristic.

15. The method of claim 14, wherein the first channel includes an agent audio input from an agent device of the individual, and
wherein the second channel includes a user audio output to a user device associated with the user.

16. The method of claim 14, wherein the speech is determined to have the first speech characteristic based on being received from an agent device via the first channel,
wherein the agent device is associated with the first speech characteristic.

17. The method of claim 14, wherein, to alter the speech, the speech alteration model is configured to:
identify, using a speech recognition technique and according to the first speech characteristic, a word in the speech;
identify, according to the word and the first speech characteristic, a first set of inflection points of audio associated with the word; and
alter, according to the word and the second speech characteristic, an audio characteristic of the first set of inflection points to form a second set of inflection points for the word.

18. The method of claim 17, wherein the audio characteristic comprises at least one of:
an audio volume,
an audio tempo,
an audio pitch, or
an audio tone.

19. The method of claim 14, wherein the accent of the individual is a first type of accent and the accent of the user is a second type of accent.

20. The method of claim 14, further comprising:
processing, by the device and using the speech alteration model, additional speech from the second channel of the audio stream to alter the additional speech from having the second speech characteristic to having the first speech characteristic;
extracting, by the device, the additional speech from the second channel; and
providing, by the device and within the first channel of the audio stream, additional altered speech that corresponds to the additional speech and that has the first speech characteristic.

* * * * *